MAGNETIC TAPE RECORDING AND/OR REPRODUCING SYSTEM AND METHOD

Filed Nov. 6, 1958 4 Sheets-Sheet 1

CHESTER W. NEWELL
INVENTOR.

BY Flehr and Swain
ATTORNEYS

MAGNETIC TAPE RECORDING AND/OR REPRODUCING SYSTEM AND METHOD

Filed Nov. 6, 1958 4 Sheets-Sheet 2

CHESTER W. NEWELL
INVENTOR.

BY Flehr and Swain
ATTORNEYS

CHESTER W. NEWELL
INVENTOR

BY Flehr and Swain
ATTORNEYS

MAGNETIC TAPE RECORDING AND/OR REPRODUCING SYSTEM AND METHOD

Filed Nov. 6, 1958

CHESTER W. NEWELL
INVENTOR

BY Flehr and Swain
ATTORNEYS 3,114,001

MAGNETIC TAPE RECORDING AND/OR REPRODUCING SYSTEM AND METHOD

Chester W. Newell, Sunnyvale, Calif., assignor to Ampex Corporation, Redwood City, Calif., a corporation of California Filed Nov. 6, 1958, Ser. No. 777,168
11 Claims. (Cl. 178—5.4)

This invention relates generally to a magnetic tape recording and/or reproducing system and method and more particularly to a recording and/or reproducing system and method suitable for recording and reproducing color video signal intelligence.

As is well known, the chrominance information of a color video signal is carried as a pair of frequencies which are modulated on a color sub-carrier, a two phase modulation system. The FCC standards, which were set up to permit recovery of color information from the transmitted video signal, specify in effect that phase shift of the sub-carrier over one scanning interval may not exceed 5°; the absolute sub-carrier frequency cannot deviate more than three parts per million overall and the maximum frequency drift velocity must be maintained within one-tenth cycle per second. When these three conditions are met, the receiver is enabled to appropriately recover the chrominance, Q and I, information by conventional synchronous demodulation techniques. In order to enable the receiver to suitably display the luminance component (Y) with the chrominance components (Q and I) and interlace the sub-carrier sidebands on the screen, it is required that the phase shift of the sub-carrier relative to the synchronizing pulse leading edge does not exceed 45°. When all of these requirements are met, the receiver is enabled to recover the chrominance information and to form a suitable color picture.

Wideband signal intelligence such as the monochrome and color video signals may be recorded magnetically on magnetic tape and thereafter reproduced to form the original signal. Suitable recording systems are described in copending applications Serial No. 427,138, filed May 3, 1954; Serial No. 506,182, filed May 5, 1955; Serial No. 524,004, filed July 25, 1955; Serial No. 552,868, filed December 13, 1955; Serial No. 614,420, filed October 8, 1956; and Serial No. 636,536, filed January 28, 1957. In general, the systems disclosed in said copending applications employ a relatively wide magnetic tape together with a rotating head assembly. The head assembly includes a plurality of circumferentially spaced magnetic heads which sweep successively across the tape as it is driven lengthwise. Margins of the tape are erased and serve to receive sound and control signal information. The remaining lateral extending track portions are of such length that end parts of one track at one edge of the tape contain a recording which is a duplicate of the end part of the next track at the other edge of the tape.

Apparatus of this type is suitable for recording amplitude modulated signals. However, it has been found desirable to employ a novel form of frequency modulated carrier recording, in accordance with the system and method disclosed in copending application Serial No. 524,004.

It is apparent that it is difficult to maintain the peripheral velocity of the recording heads constant or, if lengthwise recording is employed in maintaining the capstan speed constant. Any variations of these speeds lead to errors in the frequency and phase of the recorded signal intelligence. These variations may introduce timing and phase errors which are outside of the FCC standards for color television broadcasting.

It is a general object of the present invention to provide a recording and reproducing system and method suitable for recording and reproducing color video information in which the timing and phase errors are maintained within the FCC standards.

It is another object of the present invention to provide a recording and/or reproducing system and method for electronically correcting phase and timing errors which arise during recording and/or reproduction.

It is another object of the present invention to provide a color television recording and/or reproducing system and method in which the reproduced signal is demodulated line by line to form the component monochrome and chrominance signals.

It is another object of the present invention to provide a color television recording and/or reproducing system and method in which the local sub-carrier oscillator frequency is derived line by line from the reproduced signal and employed to demodulate the reproduced video signal line by line.

It is another object of the present invention to provide a color television signal recording and/or reproducing system and method in which the information is demodulated line by line to form the component monochrome and chrominance signals and these signals are, in turn, employed to re-modulate a new sub-carrier to form a composite color signal which is within the FCC standards.

It is a further object of the present invention to provide a recording and/or reproducing system in which timing and phase errors introduced by the inability to maintain constant speeds, wear, dimensional changes and the like are electronically compensated.

These and other objects of the invention will become more clearly apparent from the following description when taken in conjunction with the accompanying drawing.

Referring to the drawing.

Figure 1:
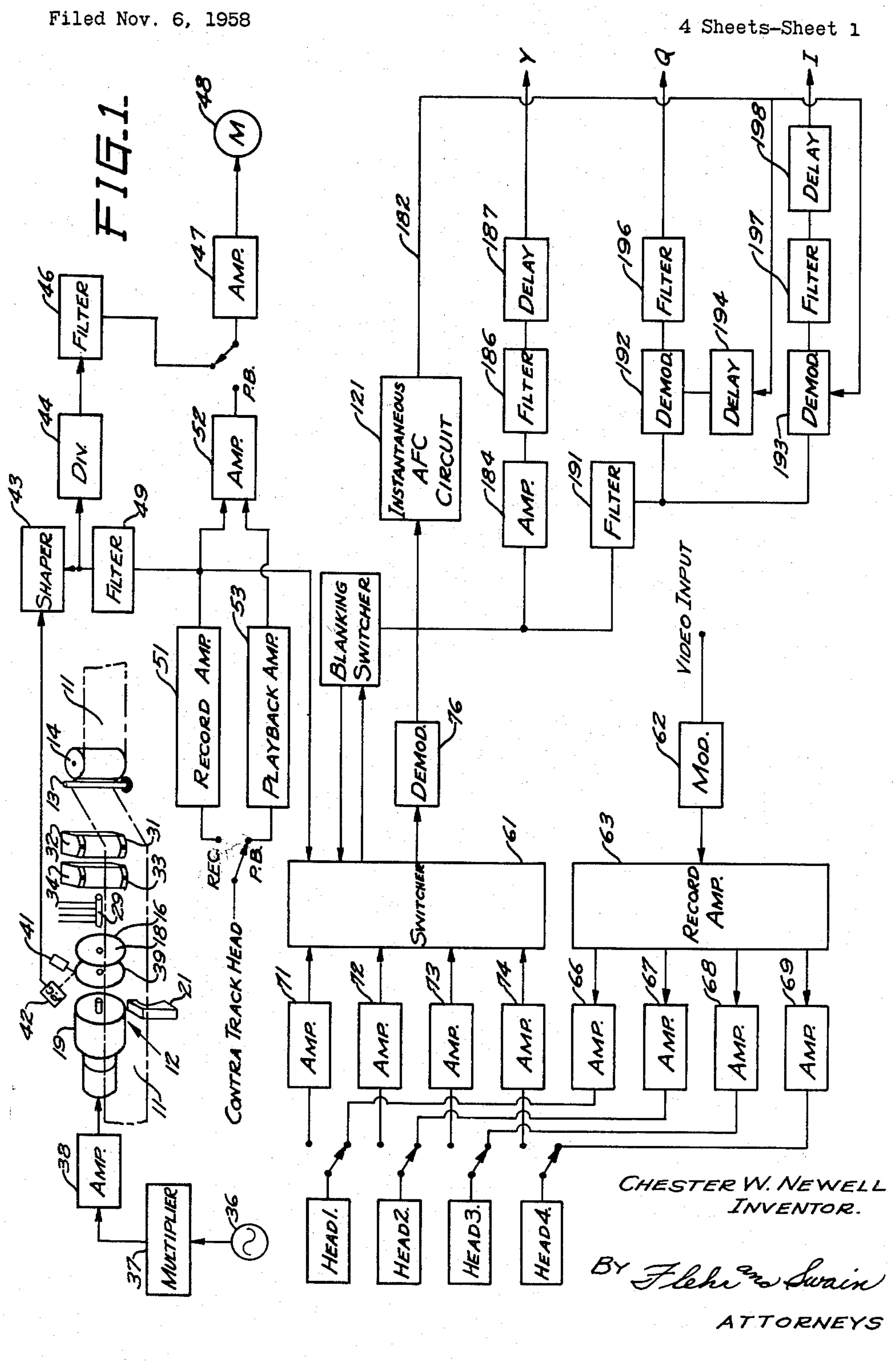
FIGURE 1 is a diagram schematically illustrating a magnetic tape recording and/or reproducing system incorporating the present invention.
Figure 7:
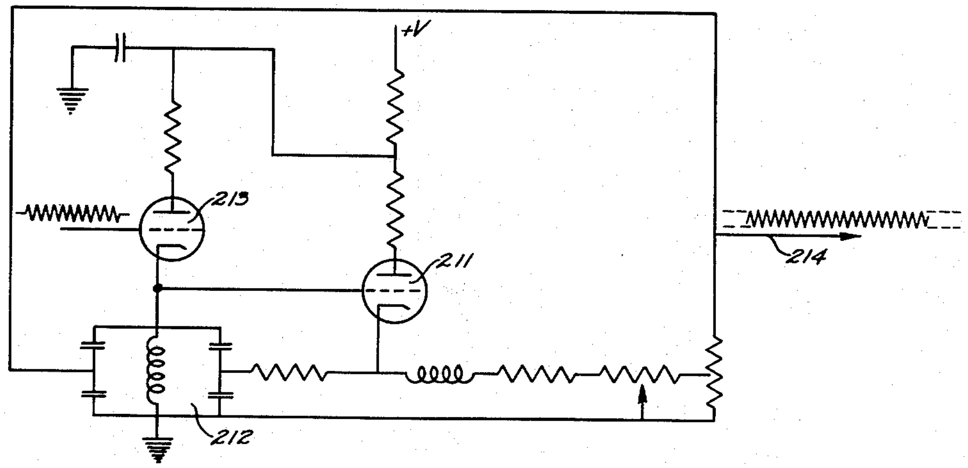
FIGURE 7 is a circuit diagram of an oscillator suitable for use in the circuit of FIGURE 3.
Figure 8:
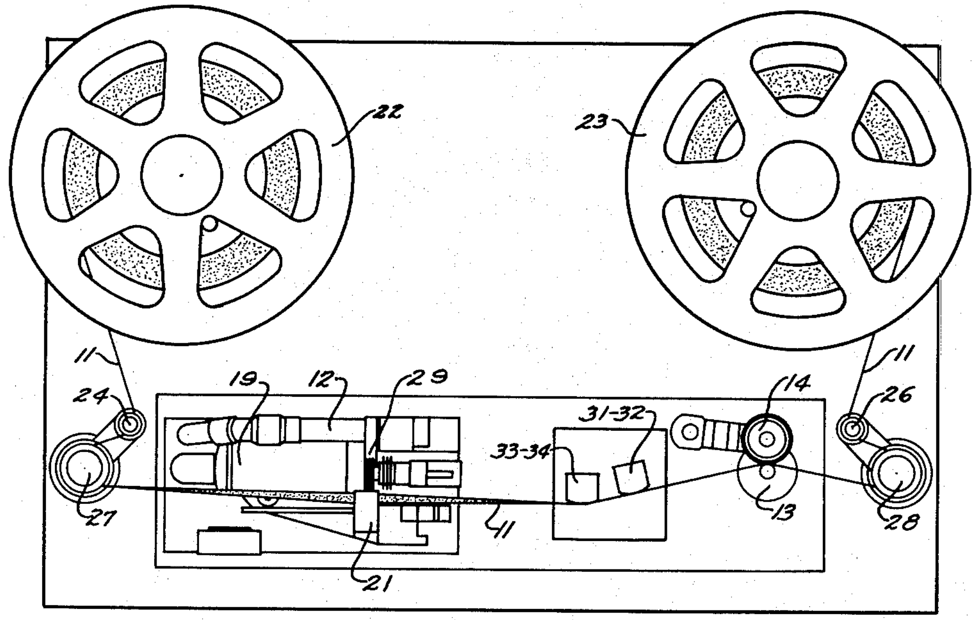
FIGURE 8 is an elevational view of a suitable transport mechanism for the magnetic tape.

Referring to FIGURES 1 and 7, the magnetic tape 11 is driven lengthwise past the transducing head assembly 12 by means of a capstan drive 13 acting in conjunction with a capstan idler 14. A plurality of transducing heads or units 16 are carried on the periphery of a disc or drum 18 which is driven by a synchronous motor 19. Suitable guide means 21 serve to hold the tape in conformity with the circular shape of the head drum whereby the tape is engaged successively by the heads as they sweep across the same.

The tape 11 is supplied from a supply reel 22 and is wound onto a take-up reel 23. The tape is guided past the transducing head assembly designated generally by the reference numeral 12 by suitable self-aligning guide posts 24 and 26, and rollers 27 and 28. The supply and take-up reels may be carried on turn-tables in accordance with customary practice. Suitable motors may be provided for the turn-table associated with the reels in accordance with customary practice.

In operation, one head is always in contact with the tape. The heads are connected to the electronic elements of the system by a commutator 29 which is schematically illustrated in FIGURE 1. The commutator may, for example, include slip rings connected to each of the heads and brushes serving to make sliding contact with the rings.

During recording of signal intelligence, the rotational velocity of the head drum 18 and of the capstan 13 are maintained with a specified relationship. During the reproducing process the relationship of rotational velocity of the head drum 18 and capstan 13 is maintained the same as during recording within narrow limits. For this purpose, a control signal is recorded on a control track along the lower edge of the tape by a magnetic transducing device 31. The control signal is recorded as a control track during recording and during reproduction it is reproduced, amplified and used to control the relative speeds of the drum and capstan in a manner to be presently described in detail. A recording head 32 serves to record the sound information on one side of the magnetic tape. Sound track and control track erase heads 33 and 34 may precede the heads 31 and 32.

The electronic circuitry illustrated in the block diagram of FIGURE 1 may be divided into the speed control circuits and the video electronic circuits. For a more clear understanding of the invention, the two circuits will be described individually.

A control frequency 36 provides the control frequency for the apparatus. For example, the frequency 36 may be the power line frequency or may be derived from a crystal controlled oscillator by means of suitable divider circuits. The frequency 36, which hereinafter will be assumed to be the line frequency, is applied to a multiplier 37 which serves to multiply the 60 cycle line frequency to provide a signal frequency of, for example, 240 cycles. In the description which follows it will be assumed that the operating frequency is 60 cycles; however, the invention is not limited in this respect as other frequencies may be employed. The signal from the multiplier is applied to an amplifier 38 which may be a three phase power amplifier. The amplifier supplies power to the synchronous motor 19. As previously described, the motor 19 serves to drive the head drum 18 which carries the transducers 16.

A revolving disc 39 is also carried by the motor shaft. The disc 39 is coated half black and half white. A suitable light source 41 is focused on the disc and the light is reflected from the disc onto a photocell 42. The output of the photocell 42 is approximately a squarewave having a frequency equal to the rotational velocity of the motor 19. For the example cited, the output squarewave will have a frequency of 240 cycles per second. This wave is passed through a shaper 43, and applied to a frequency divider 44 which serves to divide down the frequency. For example, the divider 44 may divide by four to supply a 60 cycle frequency to the filter 46. The filter 46 is a band pass filter which forms an output signal which is substantially a sinewave. The sinewave output of the filter 46 is applied to an amplifier 47 during the recording operation. The output of the amplifier 47 is applied to a capstan motor 48. Thus, the capstan motor is driven at a rotative velocity which is directly related to the rotative velocity of the head drum 18. (The capstan is enslaved to the head drum.) The tape moves a predetermined distance lengthwise during each complete revolution of the head drum.

The output from the shaper 43 is applied through a filter 49 to a control track amplifier 51 which supplies its signal to the control track record head 31.

During reproduction the control signal 36 is again applied to the multiplier 37 and amplified and fed to the synchronous motor 19. The motor drives the head drum at approximately the correct rotational velocity for the purpose of tracing the previously recorded transverse record. The photocell 42 again derives a signal which is shaped and passed through the filter 49. The signal from the filter 49 is fed to a phase comparator in the capstan servo amplifier 52. A signal is also applied to the comparator from the control track playback amplifier 53 which is fed from the control track head during reproduction. The comparator produces a resultant signal, which is a function of the phase difference between the signals from the control track and the photocell. This signal is applied through a filter to the grid of a reactance tube which is one of the frequency determining elements of a conventional Wein bridge oscillator. The oscillator functions nominally at the recording frequency (in the illustrative example, 60 cycles) but the frequency is modified up and down by the signal from the phase comparator. The output signal is fed to the amplifier 47 which drives the capstan motor and controls its rotative velocity.

The effect of this system is to cause the capstan 13 to revolve during reproduction in exactly the same relationship to the revolving drum 18, within narrow limits, as it did during the recording process. Once the drum is adjusted on the center of a track at the beginning of a reproduction, the system holds the relationship constant and the revolving heads indefinitely trace accurately the recorded video transverse tracks. A suitable control system is described in copending application Serial No. 506,182, above.

As previously described, the lower portion of FIGURE 1 includes the video electronics. The only connection between the video and control electronics is the output of the filter 49 connected to the switcher 61. This signal is employed, as will be presently described, to perform the switching operation from one playback head to the next (from one slip ring to another) during reproduction.

The record electronics can consist of suitable means for producing a modulated carrier together with suitable recording amplifiers. FM recording is preferred, although AM may be used. Assuming the use of FM recording, the record electronics can include a modulator 62 and a record amplifier 63. The output of the amplifier 63 is continuously applied to the individual head amplifiers 66–69.

As described above, it is preferable to use FM recording. The type of FM recording which can be used for satisfactory recording and reproduction of video images disclosed in copending application Serial No. 524,004, filed July 25, 1955. It is also described in copending application Serial No. 552,868, filed December 13, 1955.

A suitable type of modulator for use in frequency modulation where the deviation does not exceed 1 megacycle and where the carriers do not exceed perhaps 6 megacycles may comprise a multivibrator oscillator whose frequency is controlled by direct application of the signal to its control grid. The multivibrator output is amplified through conventional wideband amplifiers and applied to the amplifier 63 and thence to the head amplifiers 66–69.

During reproduction the output of each head is fed individually to its own pre-amplifier 71–74 respectively. The four pre-amplifiers are connected to a switcher 61. From the switcher a single channel frequency modulated signal is fed to the demodulator 76, which may be of the type previously described.

It is apparent that during reproduction it is necessary to derive the amplified output signal from one head at a time, switching from one pre-amplifier 71–74 to the next at a moment in the signal when minimum disturbance will be introduced in the reproduced signal. An electronic switcher may be employed. The switcher may be of the type described in copending application Serial No. 614,420, above.

As previously described, the signal output from the demodulator 76 may have timing and phasing errors which are intolerable. That is, the demodulated reproduced video signal may not be applied directly to a transmitter for transmission since a receiver could not recover the information to form a satisfactory image. These errors may arise from stretching or contraction of the tape, wear of the heads, and variations in speed of the rotating drum assembly among others. The instantaneous AFC circuit to be presently described serves to form a frequency which is suitable for demodulating the signal line by line to produce the luminance and chrominance signals Y, Q and I. These may then be re-modulated upon a new sub-carrier for transmission in conventional manner.

Figure 2:
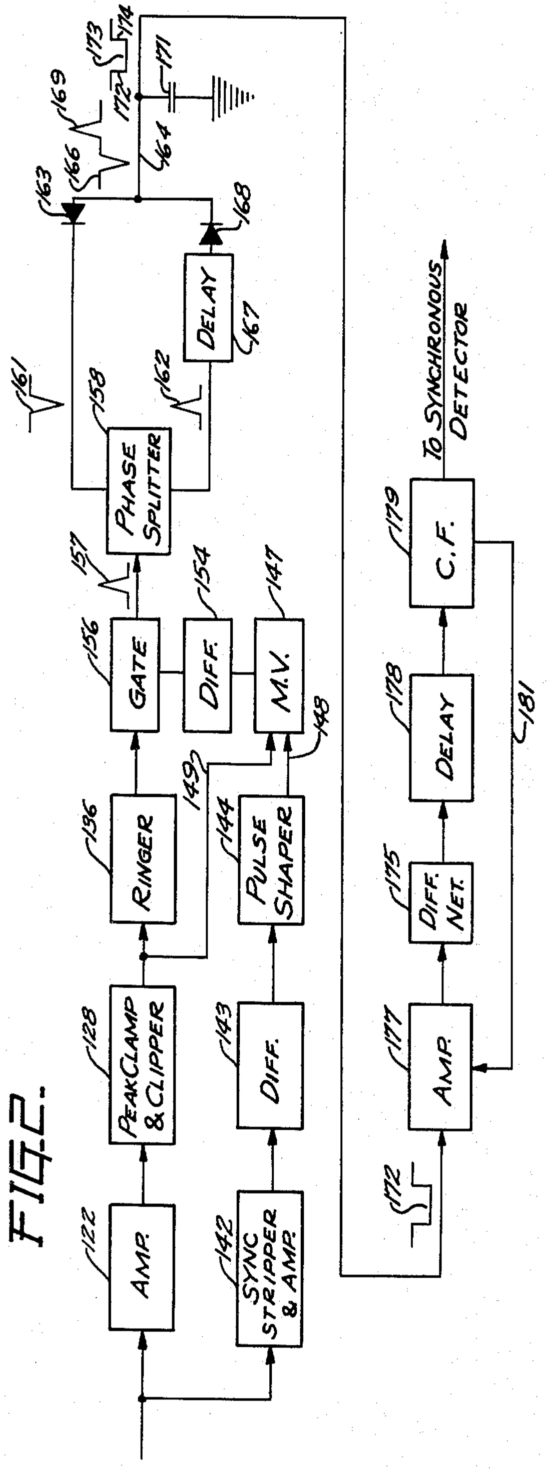
FIGURE 2 is a block diagram of circuitry for electronically correcting for phase and timing errors arising in the recording and/or reproduction of color television video intelligence.

The instantaneous AFC circuit 121 is shown in greater detail in FIGURE 2. Briefly, the circuit serves to receive the composite signal from the demodulator 76 and to derive a local frequency which is controlled by the preceding color burst. The circuit acts instantaneously to form the local frequency. This signal is employed in modulating circuits to recover the Q and I signals from the composite signal.

Figure 4:
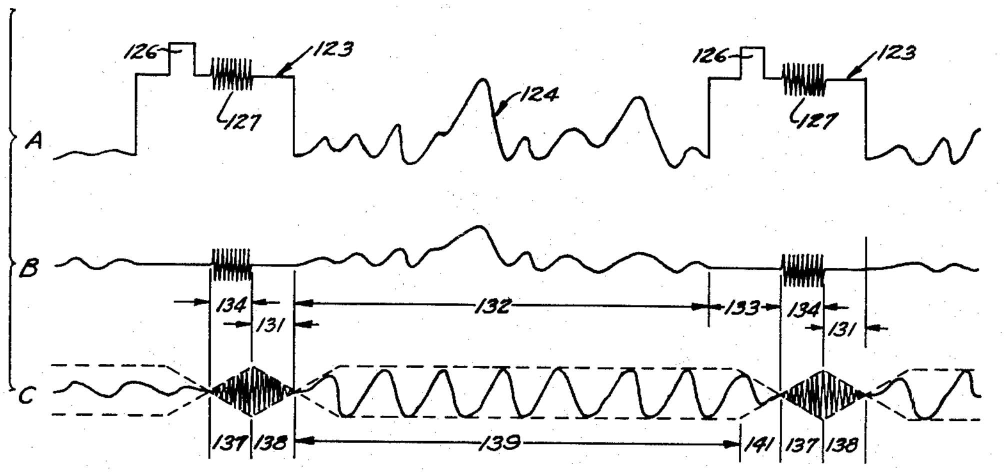
FIGURE 4 shows the waveforms at various points in the circuit of FIGURE 2.

The output from the demodulator 76 is applied to a band pass amplifier 122 which may, for example, have an amplification of 100 and a bandwidth of approximately 2.5–4.5 mc. The amplified signal from the output of the amplifier 122 is shown at FIGURE 4A. As is well known, the signal includes a horizontal blanking pulse 123 and the video signal information 124. The horizontal blanking pulse 123 includes the horizontal sync pulse 126 and the color burst 127. As is well known, the color burst has a minimum period of 8 cycles.

The output of the amplifier 122 is applied to a peak clamp and clipper 128 which provides constant amplitude bursts, clean of all other surrounding 3.58 mc. information. The amplitude is less than approximately 80% that of the color burst. As a consequence, the burst amplitude can drop as much as 80% theoretically without effecting the output of the peak clamp and clipper 128. The output of the peak clamp and clipper 128 is illustrated, FIGURE 4B. The interval 131 corresponds to the back porch interval. The interval 132 corresponds to the active scan or video signal interval, the interval 133 corresponds to the front porch interval and the interval 134 corresponds to the burst interval.

The output from the peak clamp and clipper is applied to a ringer 136. The ringer 136 is a moderately high Q circuit, requiring approximately 25 cycles of color burst or about 7 microseconds for complete buildup (also decaying in a like time). This is less than the time between the leading edge of the blanking pulse and the beginning of the color burst, so that no energy from the video signal is carried over in the ringer to the instant when the color burst is applied. This circuit provides a relatively linear buildup during the first 8 cycles of the color burst 134, so that the eighth ring of the ringing circuit is the geometric average in both phase and amplitude of the preceding eight color burst cycles. With the Q of the ringing circuit suitably selected, a waveform of the type illustrated in FIGURE 4C results. Thus, the amplitude of the ringer circuit builds up as illustrated at 137 during the burst interval and then decays as illustrated at 138. The active scan is represented by the interval 139, and the horizontal blanking period prior to the burst is shown at 141.

Figure 5:
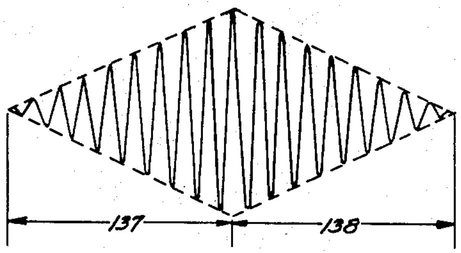
FIGURE 5 shows an enlarged view of a portion of the waveform of FIGURE 4C.

Referring to FIGURE 5, an enlarged view of the portions 137 and 138 of the ringer circuit signal is illustrated. Thus, it is seen that the ringing circuit builds up substantially linearly to the eighth cycle and then decays. A gating circuit which serves to select the eighth pulse which contains information corresponding to the time average of the preceding eight cycles will be presently described.

Figure 6:
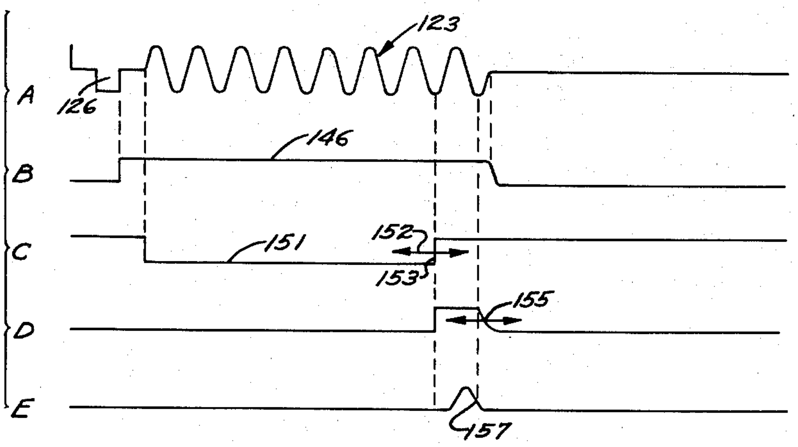
FIGURE 6 shows waveforms at various points of the circuit of FIGURE 2.

The signal is also applied to a sync stripper and amplifier 142 which serves to strip off the horizontal sync pulses and amplify the same. The amplified horizontal sync pulses are applied to a differentiating circuit 143 and a pulse shaper 144 which serves to give flat topped positive gating pulses 146, FIGURE 6, immediately following the horizontal sync pulses 126. The gating pulses have a duration of approximately 4.4 microseconds (3.50 microseconds–4.75 microseconds, maximum).

The gating pulses are applied to a one-shot multivibrator 147. The multivibrator is such that it will not trigger without simultaneous application of the pulses 146 on the line 148 and pulses from the peak clamp and clipper 128 on the line 149. When clean bursts from the peak clamp and clipper amplifier 128 are applied to the multivibrator 147 along the line 149, the multivibrator will trigger as illustrated in FIGURE 6C, curve 151.

The multivibrator 147 is a mono-stable multivibrator which has a time constant corresponding to the time lapse of eight cycles of the color burst plus or minus 45° as indicated by the arrow 152. When the multivibrator 147 reverts to its original state, the rising waveform 153 is applied to the differentiating circuit 154 which serves to form a sharply rising pulse. The differentiator also includes a clipping means which serves to clip off the peak of the spike formed by the differentiating circuit to give a waveform of the type shown at 155, FIGURE 6D. The trailing edge of the wave 155 may vary plus or minus 45° timewise.

The pulse 155 is then applied to the gate 156 and serves to open the same. With the gate 156 open, the positive half-cycle of the eighth cycle of the output of the ringer 136 is passed through the gate as indicated at 157, FIGURE 6E. The positive wave 157 is applied to a phase splitter 158 which forms a pair of pulses 161, 162. The pulse 161 is passed by the diode 163 and appears on the line 164 as indicated at 166. The pulse 162 is applied to a delay line 167 which serves to delay the transmission of the pulse. The output of the delay line is applied to a diode 168 and the pulse appears at 169. The time lapse between the application of the pulse 166 and the pulse 169 to the line 164 is determined by the delay of the delay line 167 and, for example, in one instance was adjusted to equal 0.3 microsecond.

The pulse 166 serves to charge the capacitor 171 in a negative direction as shown at 172 in pulse 173. The condenser then remains charged until the pulse 169 is applied thereto. The pulse 169 discharges the capacitor as indicated at 174. Thus, a squarewave is formed which has a precise pulse duration equal to the time lapse between the pulses 166 and 169, in this instance 0.3 microsecond. This duration may be controlled by controlling the delay in the delay line 167.

The pulse 173 is applied to the control grid of amplifier 177 and serves to cut off the amplifier for a period equal to the period of the pulse. When the amplifier is turned on, the output is applied to a differentiating network 175 and thence to delay line 178. The output of the delay line is applied to a cathode follower 179. A feedback signal is applied along the line 181 to the cathode of the amplifier 177 in proper phase for sustaining oscillations. The amplifier oscillates at a frequency which is dependent upon the delay provided by the delay line 178. Operation of the circuit just described is as follows: When the tube is cut off, the plate voltage rises producing a differentiated positive pulse. This pulse is transmitted through the delay line, arriving back at the amplifier while it is still cut off, so it is lost. At the instant of release by pulse 173, the plate voltage of the amplifier suddenly falls, producing a differentiated negative pulse at the input to the delay line. This pulse arrives back at the input to the amplifier an instant "T" later, determined by the delay time, and is fed into the amplifier, at the cathode, in such a manner as to reappear at the plate in antiphase to its previous appearance "T" microseconds earlier. The gain of the amplifier is adjusted so that an oscillation of frequency $1/2T$ will be sustained. The oscillator will continue to oscillate until the next pulse 173 appears at the grid of the amplifier. Thus, the circuit operates as a pulsed oscillator and the oscillations are cut-off, or quenched, for the period of the pulse 173.

To form oscillations having a frequency corresponding to the instantaneous frequency of the preceding color burst which is required for line by line demodulation, the delay introduced by the delay line is nominally .279 microsecond, giving a frequency of oscillation of 3.58 mc. It is noted that the pulse 173 has a duration slightly longer than one cycle of the 3.58 mc. oscillations whereby the delay line and oscillating circuit are cleared at the end of each scan line to again begin oscillations in proper phase relationship with the controlling color burst.

As previously described, the signal output at the line 182 which is the demodulation frequency having the proper phase relationship with respect to the reproduced signal is applied to a demodulator circuit which serves to demodulate the reproduced signal.

Referring again to FIGURE 1, a suitable demodulation circuit is shown. The circuit is of the well known synchronous detector type and will only be briefly described since such circuits are well known in the art. The output of the demodulator 76 is applied to an amplifier 184, filter 186 and delay line 187 to produce the Y or luminance component of the color signal.

The output of the demodulator 76 is also applied to a filter 191 and then to demodulators 192 and 193. The demodulation frequency (from the AFC oscillator) is applied to the demodulator 192 after a phase delay in the delay line 194 of 90°. The output of the demodulator 192 is applied to a filter 196 and forms the Q portion of the chrominance signal. The demodulation frequency is applied directly to the demodulator 193. The output of the demodulator is applied to a filter 197 and a delay line 198 to form the I portion of the chrominance signal. The Y, Q and I signals are properly recovered since the phase relationship of the sub-carrier demodulation frequency is adjusted during each scan line in accordance with color burst information.

The reproduced signals may then be applied to a suitable modulator to again form a composite color signal which is suitable for transmission and which does not include the phase errors introduced in the recording and reproducing process.

Figure 3:
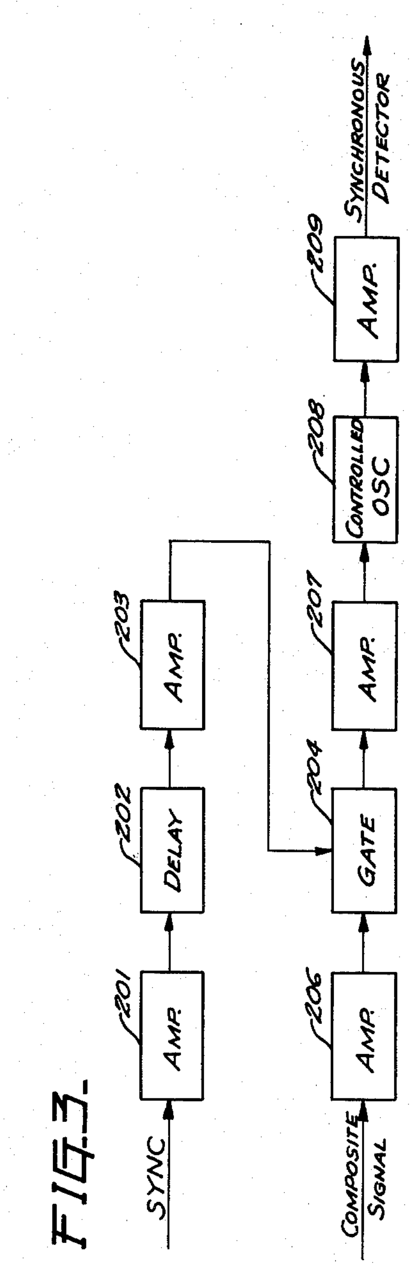
FIGURE 3 is a block diagram of other circuitry for electronically correcting for phase and timing errors arising in the recording and/or reproduction of color television video intelligence.

Referring to FIGURE 3, another AFC circuit suitable for deriving a local frequency is shown. Briefly, this circuit serves to receive the composite signal from the demodulator 76 and to derive a local frequency whose phase is controlled by the last preceding color burst. The circuit acts instantaneously to adjust the phase of the local frequency on a line by line basis. The local signal frequency is employed as previously described in the demodulating circuits to recover the Q and I signals from the composite signal.

The reproduced signal is applied to suitable sync stripper, such as sync stripper 142, and the sync is applied to an amplifier 201 which serves to amplify the signal and apply the same to a delay means 202. The delay means interposes an adjustable delay in the sync pulses. The delayed sync is amplified by amplifier 203 and applied to control a gate 204. The gate serves to gate the color bursts to the associated controlled oscillator as will be presently described.

The reproduced composite signal is subjected to one or more stages of amplification designated by the amplifier block 206. One of the stages is preferably tuned to the color burst frequency whereby the signal applied to the gate is only the color burst. No effort is made to retain the wave shape of the remainder of the composite signal. By adjusting the delay introduced by the variable delay means 202, the preceding sync pulse serves to open the gate 204 at a proper moment for passing the color burst.

The color bursts are then amplified by amplifier 207 and applied to a controlled oscillator 208. The controlled oscillator is tuned to the frequency of the color carrier. It responds to a color burst from the gate whereby the oscillations which it produces are in phase with the reproduced color bursts. The pulsed oscillations are amplified by an amplifier 209 and then employed in the synchronous detector to demodulate the composite signal and recover the component signals therefrom.

The controlled oscillator may be any of the well known types as, for example, the type shown in FIGURE 7. The oscillator circuit includes the tube 211 and the tuned circuit 212 which determines the frequency of operation. The tuned circuit 212 is connected between the tube 213 and ground. The color bursts are applied to the grid of the tube 213 and the positive portions of the bursts render the tube 213 conducting, grounding the tuned circuit for each positive portion of the oscillation cycle. The negative portions of the cycle render the tube 213 non-conducting, allowing the tuned circuit to resonate. As a result, the tuned circuit is excited by the input burst in such a manner that upon termination of the burst the oscillator comprising the tuned circuit 212 and tube 211 oscillates at a frequency which is determined by the resonant circuit 212 and at the phase of the input color burst. The output signal is obtained from the tuned circuit and is available at the line 214. Thus, a pulsed oscillation or local frequency is formed which has a phase corresponding to the phase of the last preceding burst. This signal is employed in the synchronous detector to demodulate the composite signal in the manner previously described.

Thus, it is seen that a novel recording and reproducing system is provided. The system is not effected by timing and phasing errors introduced by the recording and reproduction process. The information is recovered line by line by producing an instantaneous local frequency which is used to demodulate each line. Long time changes of frequency are compensated for by a comparison from line to line and controlling the oscillation frequency of the local oscillator in accordance with the frequency changes.

This application is a continuation-in-part of copending application Serial No. 721,472 filed March 14, 1958.

I claim:

1. The method of demodulating a composite color video signal which comprises the steps of generating a local frequency signal having a phase which is established by an immediately preceding color burst, employing said local frequency signal to demodulate a next subsequent line of color signal, and quenching said local frequency signal prior to the next succeeding color burst.

2. The method of demodulating a composite color video signal of the type which includes video intelligence, synchronizing pulses and color bursts, comprising the steps of deriving a local frequency signal whose phase is instantaneously controlled by an immediately preceding color burst, employing said signal of signal frequency to demodulate a next following line of video signal intelligence information, and quenching said local frequency signal prior to the next succeeding color burst.

3. The method of deriving the component black and white and color signals from a recording of a composite color video signal of the type which includes video intelligence, synchronizing pulses and color bursts which comprises the steps of reproducing the recorded composite signal, generating a local frequency signal having a phase which is established by an immediately preceding reproduced color burst, employing said local frequency signal to demodulate a next subsequent reproduced line of video intelligence, and quenching said signal prior to the next succeeding reproduced color burst.

4. The method of deriving the component black and white and color signals from a recording of a composite color video signal of the type which includes video intelligence, synchronizing pulses and color frequency bursts which comprises the steps of reproducing the recorded composite signal, deriving a local frequency signal whose phase is instantaneously controlled by a last preceding reproduced color burst, and employing said local frequency signal to demodulate a next reproduced line of video intelligence, and quenching said local frequency signal prior to the next succeeding color burst.

5. A system for demodulating a composite color video signal of the type which includes video intelligence, synchronizing pulses and color bursts, comprising means for forming a local signal having a phase which is controlled entirely by the last-preceding color burst, demodulating means serving to receive the composite color signal and the local frequency signal and serving to form the component color signals, and means for quenching said local frequency signal prior to the next succeeding color burst.

6. A system for demodulating a composite color video signal of the type which includes video intelligence, synchronizing pulses and color bursts, comprising a pulsed oscillator serving to generate a pulse of oscillations with the oscillations in phase with the oscillations of the last preceding color burst, demodulating means serving to receive the composite color signal and the generated oscillations and serving to demodulate the composite signal to form the component signals from each line of color information, and means for quenching said oscillations prior to the next succeeding color burst.

7. In a system of the character described in which a composite video signal including video intelligence, synchronizing pulses and color bursts is recorded on magnetic tape, the record being in the form of successive tracks extending cross-wise of the tape and spaced in the direction of the length of the tape, means for reproducing the recording having a head adapted to rotate at a predetermined speed, a plurality of circumferentially spaced magnetic transducer units carried by the head and adapted to successively sweep across the tape, and switching means serving to selectively switch to the transducer units, the combination comprising means serving to receive the output of the switcher and form a local frequency signal having an instantaneous phase established by the last-preceding reproduced color burst, demodulating means serving to receive the switched reproduced signal and the local frequency signal and serving to demodulate the reproduced video signal to form the component color signals, and means for quenching said local freqeuncy signal prior to the next succeeding color burst.

8. In a system of the character described in which a composite video signal including video intelligence, synchronizing pulses and color bursts is recorded on magnetic tape, means for reproducing the recording, means forming a local frequency signal having a phase which is established by the last-preceding reproduced color burst, demodulating means serving to receive the reproduced composite color signal and the local frequency and serving to demodulate the composite signal to form the component color signals, and means for quenching said local frequency signal prior to the next succeeding color burst.

9. In a system of the character described in which a composite video signal including video intelligence, synchronizing pulses and color bursts is recorded on magnetic tape, means for reproducing the recording, a pulsed oscillator serving to receive the color bursts and form a pulse of oscillations having a phase corresponding to the last-preceding reproduced color burst, demodulating means serving to receive the reproduced composite color signal and the pulse of oscillations and serving to demodulate the next line of the composite signal, and means for quenching said oscillations prior to the next succeeding color burst.

10. In a system of the character described in which a composite video signal including video intelligence, synchronizing pulses and color bursts is recorded on magnetic tape, the record being in the form of successive tracks extending crosswise of the tape and spaced in the direction of the length of the tape, means for reproducing the recording having a head adapted to rotate at a predetermined speed, a plurality of circumferentially spaced magnetic transducer units carried by the head and adapted to successively sweep across the tape, and switching means serving to selectively switch to the transducer units, the combination comprising a pulsed oscillator serving to receive the color bursts and form a local frequency signal having a phase corresponding to the last-preceding reproduced color burst, demodulating means serving to receive the switched reproduced signal and the local frequency signal and serving to demodulate the reproduced video signal to form the component color signals, and means for quenching said local frequency signal prior to the next succeeding color burst.

11. In a system of the character described in which a composite video signal including video intelligence, synchronizing pulses and color bursts is recorded on magnetic tape, the record being in the form of successive tracks extending crosswise of the tape and spaced in the direction of length of the tape, means for reproducing the recording having a head adapted to rotate at a predetermined speed, a plurality of circumferentially spaced transducer units carried by the head and adapted to successively sweep across the tape, switching means having input terminals connected to each of the transducer units and an output terminal, said switching means serving to selectively connect the transducer units to the output terminal, the combination comprising a pulsed oscillator connected to receive the output of the switcher, said pulsed oscillator generating pulsed oscillations having an instantaneous phase which is established by the last-preceding color burst of the reproduced signal, demodulating means connected to the output terminal of the switching means, said demodulator being also connected to receive the pulsed oscillations from the pulsed oscillator and serving to demodulate the following reproduced video signal line by line to form the component color signals, and means for quenching said oscillations prior to each succeeding color burst.

References Cited in the file of this patent

UNITED STATES PATENTS

| | | |
|---|---|---|
| 2,712,568 | Arvins | July 5, 1955 |
| 2,713,612 | Nero | July 19, 1955 |
| 2,758,155 | Kirkwood | Aug. 7, 1956 |
| 2,848,529 | Werenfels | Aug. 19, 1958 |
| 2,875,272 | Cuccia | Feb. 24, 1959 |
| 2,979,557 | Schroeder | Apr. 11, 1961 |

OTHER REFERENCES

RCA Review, March 1954, page 10.